US011447017B2

(12) United States Patent
Patel et al.

(10) Patent No.: US 11,447,017 B2
(45) Date of Patent: Sep. 20, 2022

(54) CONTROL OF USER-SELECTABLE VEHICLE DECELERATION RATE TO MAXIMIZE REGENERATION FOR ELECTRIFIED PROPULSION SYSTEMS

(71) Applicants: Nadirsh Patel, Farmington Hills, MI (US); James R Hollowell, Brownstown Township, MI (US); Divya E Gorecki, Troy, MI (US); Chandan Lakshmanaiah, Troy, MI (US); Zachary C Rogalski, Rochester Hills, MI (US); Richard Roy, Auburn Hills, MI (US)

(72) Inventors: Nadirsh Patel, Farmington Hills, MI (US); James R Hollowell, Brownstown Township, MI (US); Divya E Gorecki, Troy, MI (US); Chandan Lakshmanaiah, Troy, MI (US); Zachary C Rogalski, Rochester Hills, MI (US); Richard Roy, Auburn Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 322 days.

(21) Appl. No.: 16/776,906

(22) Filed: Jan. 30, 2020

(65) Prior Publication Data
US 2021/0237582 A1 Aug. 5, 2021

(51) Int. Cl.
*B60L 7/26* (2006.01)
*B60L 3/00* (2019.01)
(Continued)

(52) U.S. Cl.
CPC .............. *B60L 7/26* (2013.01); *B60K 6/28* (2013.01); *B60L 3/0076* (2013.01); *B60L 7/18* (2013.01);
(Continued)

(58) Field of Classification Search
CPC . B60L 7/26; B60L 7/18; B60L 3/0076; B60K 6/28; B60T 7/12; B60T 8/17;
(Continued)

(56) References Cited

U.S. PATENT DOCUMENTS

| 4,671,577 A | 6/1987 | Woods |
| 5,924,508 A | 7/1999 | Clauss et al. |

(Continued)

FOREIGN PATENT DOCUMENTS

| EP | 2065282 A1 | 6/2009 |
| EP | 2463165 A1 | 6/2012 |

(Continued)

OTHER PUBLICATIONS

International Search Report and Written Opinion dated May 12, 2021 for International Application No. PCT/US2021/015377, International Filing Date Jan. 28, 2021.

(Continued)

*Primary Examiner* — Tisha D Lewis
(74) *Attorney, Agent, or Firm* — Ralph E. Smith

(57) ABSTRACT

An electrical regeneration and vehicle deceleration control method includes operating an electrified powertrain in normal or maximum regeneration modes associated with lesser and greater electrical regeneration and vehicle deceleration rates, respectively, receiving an input from a driver of the vehicle indicative of a request to enable the maximum regeneration mode, detecting a status indicative of an availability of the maximum regeneration mode, and in response to receiving the request and based on the status of the maximum regeneration mode and a current vehicle deceleration rate: (i) operating the electrified powertrain in either the maximum regeneration mode or a normal regeneration mode, (ii) selectively outputting a message to the driver indicative of the status of the maximum regeneration mode, (Continued)

and (iii) selectively commanding a hydraulic brake system of the vehicle to generate brake force based on a driver-expected vehicle deceleration rate associated with the operative regeneration mode.

20 Claims, 2 Drawing Sheets

(51) Int. Cl.
*B60L 7/18* (2006.01)
*B60T 7/12* (2006.01)
*B60T 8/17* (2006.01)
*B60W 10/188* (2012.01)
*B60W 20/00* (2016.01)
*B60W 30/18* (2012.01)
*B60K 6/28* (2007.10)
*B60T 13/58* (2006.01)
*B60T 17/18* (2006.01)
*B60W 10/06* (2006.01)
*B60W 50/14* (2020.01)

(52) U.S. Cl.
CPC ............... *B60T 7/12* (2013.01); *B60T 8/17* (2013.01); *B60T 13/586* (2013.01); *B60T 17/18* (2013.01); *B60W 10/06* (2013.01); *B60W 10/188* (2013.01); *B60W 20/00* (2013.01); *B60W 30/18127* (2013.01); *B60W 50/14* (2013.01); *B60T 2270/604* (2013.01); *B60W 2510/06* (2013.01); *B60W 2710/06* (2013.01); *B60W 2710/18* (2013.01); *B60Y 2200/92* (2013.01)

(58) Field of Classification Search
CPC .. B60T 13/586; B60T 17/18; B60T 2270/604; B60W 10/06; B60W 10/188; B60W 20/00; B60W 30/18127; B60W 50/14; B60W 2510/06; B60W 2710/06; B60W 2710/18; B60Y 2200/92
See application file for complete search history.

(56) References Cited

U.S. PATENT DOCUMENTS

| | | | |
|---|---|---|---|
| 6,554,744 B2 | 4/2003 | Schmidt | |
| 9,238,412 B2 | 1/2016 | Kidston et al. | |
| 2012/0179347 A1* | 7/2012 | Aldighieri | B60L 7/10 701/70 |
| 2013/0090822 A1* | 4/2013 | Schwindt | B60T 7/22 701/70 |
| 2017/0087992 A1* | 3/2017 | Murase | B60L 7/18 |
| 2017/0113675 A1* | 4/2017 | Oguri | B60K 6/445 |
| 2017/0120892 A1* | 5/2017 | Kato | B60L 7/18 |

FOREIGN PATENT DOCUMENTS

| | | |
|---|---|---|
| EP | 2631143 A1 | 8/2013 |
| WO | 2015/114430 A1 | 8/2015 |
| WO | 2016/094694 A1 | 6/2016 |

OTHER PUBLICATIONS

Lee, J. et al., "Rotating inertia impact on propulsion and regenerative braking for electric motor driven vehicles". IEEE Conference Publication (Abstract). 3 pages. Jun. 17, 2019.

Lewton, Dylan Lewis, "Application of Floating Pedal Regenerative Braking for a Rear-Wheel-Drive Parallel-Series Plug-In Hybrid Electric Vehicle with an Automatic Transmission"; Embry-Riddle Aeronautical University, Dissertations and Theses, 59 pages. (Dec. 2016).

* cited by examiner

CONTROL OF USER-SELECTABLE VEHICLE DECELERATION RATE TO MAXIMIZE REGENERATION FOR ELECTRIFIED PROPULSION SYSTEMS

FIELD

The present application generally relates to electrified vehicles and, more particularly, to control of a user-selectable vehicle deceleration rate to maximize regeneration for electrified propulsion systems.

BACKGROUND

An electrified vehicle comprises a battery system that supplies current to power at least one electric motor. The electric motor(s) could be utilized for propulsion or to start an internal combustion engine of the electrified vehicle. Electrified vehicles often include electrical regeneration systems (e.g., regenerative braking systems), which convert the vehicle's kinetic energy into electrical energy for recharging the battery system and/or for powering vehicle accessory loads. Conventional electrified vehicles have a single regeneration mode, which could be less than optimal (i.e., the battery system may be able to receive a larger amount of electrical energy for recharging). In addition, this regeneration mode increases a deceleration or "coastdown" rate of the electrified vehicle. Because the regeneration mode is almost always enabled, the driver expects the associated vehicle deceleration rate. When the regeneration mode is unavailable, however, the vehicle may experience a different deceleration rate, which may be undesirable to the driver. Accordingly, while such electrified vehicle systems do work well for their intended purpose, there exists an opportunity for improvement in the relevant art.

SUMMARY

According to one example aspect of the invention, an electrical regeneration and vehicle deceleration control system for an electrified vehicle having an electrified powertrain comprising an engine and at least one electric motor is presented. In one exemplary implementation, the control system comprises: a user interface and a controller configured to: operate the electrified powertrain in a normal regeneration mode associated with first electrical regeneration and vehicle deceleration rates or a maximum regeneration mode associated with greater second electrical regeneration and vehicle deceleration rates, receive, via the user interface, an input from a driver of the vehicle indicative of a request to enable the maximum regeneration mode, detect a status of the maximum regeneration mode, wherein the status is indicative of an availability of the maximum regeneration mode, and in response to receiving the request and based on the status of the maximum regeneration mode and a current vehicle deceleration rate: (i) operate the electrified powertrain in either the maximum regeneration mode or the normal regeneration mode, (ii) selectively output, via the user interface, a message to the driver indicative of the status of the maximum regeneration mode, and (iii) selectively command a hydraulic brake system of the vehicle to generate brake force based on a driver-expected vehicle deceleration rate associated with the operative regeneration mode.

In some implementations, the controller is further configured to control the electrified powertrain to use an electrical current generated by converting kinetic energy of the electrified powertrain to at least one of (i) recharge a battery system associated with the at least one electric motor and (ii) power an accessory load of the vehicle, wherein the second electrical regeneration rate of the maximum regeneration mode increases an electric range of the vehicle compared to first electrical regeneration rate of the normal regeneration mode. In some implementations, the electrified vehicle is a plug-in hybrid electric vehicle (PHEV).

In some implementations, the controller is configured to autonomously command the hydraulic brake system to apply hydraulic brakes to generate the brake force based on the driver-expected vehicle deceleration rate associated with the operative regeneration mode and without requiring any driver input via a brake pedal of the vehicle. In some implementations, the controller is further configured to autonomously command the hydraulic brake system to utilize a vacuum-independent electric brake booster to generate and provide additional hydraulic brake pressure to the hydraulic brakes to thereby generate the brake force based on the driver-expected vehicle deceleration rate associated with the operative regeneration mode and without requiring any driver input via the brake pedal.

In some implementations, when the status indicates that the maximum regeneration mode is available, the controller is further configured to: determine whether the engine is connected to a transmission of the electrified vehicle, when the engine and the transmission are connected, operate the electrified powertrain such that kinetic energy at the engine and the at least one electric motor is collectively converted into electrical energy at the second regeneration rate, and when the engine and the transmission are disconnected, operate the electrified powertrain such that kinetic energy at the at least one electric motor is converted into electrical energy at the second regeneration rate.

In some implementations, the controller is configured to determine the status of the maximum regeneration mode based on (i) whether a malfunction of the vehicle that would limit the maximum regeneration mode is present, (ii) whether the vehicle malfunction is recoverable, and (iii) when the vehicle malfunction is recoverable, whether the vehicle malfunction has recovered. In some implementations, when the vehicle malfunction is not recoverable and the current vehicle deceleration rate is less than the first vehicle deceleration rate, the controller is further configured to: when the engine is off, start the engine, operate the electrified powertrain in the normal regeneration mode such that kinetic energy at the engine and the at least one electric motor is collectively converted into electrical energy at the first regeneration rate and the current deceleration rate of the vehicle increases, output, via the user interface, a message to the driver indicating that the maximum regeneration mode is unavailable, and selectively command the hydraulic brake system to generate the brake force based on the driver-expected vehicle deceleration rate associated with the operative regeneration mode and without requiring any driver input via a brake pedal of the vehicle.

In some implementations, when the vehicle malfunction is recoverable and has recovered, the controller is further configured to: operate the electrified powertrain in the maximum regeneration mode such that kinetic energy at the engine and the at least one electric motor is collectively converted into electrical energy at the second regeneration rate, and output, via the user interface, a message to the driver indicating that the maximum regeneration mode is available. In some implementations, when the vehicle malfunction is recoverable but has not yet recovered, the controller is further configured to: operate the electrified powertrain in the normal regeneration mode such that kinetic energy at the engine and the at least one electric motor is collectively converted into electrical energy at the first regeneration rate, and output, via the user interface, a message to the driver indicating that the maximum regeneration mode is temporarily unavailable.

According to another example aspect of the invention, an electrical regeneration and vehicle deceleration control method for an electrified vehicle having an electrified powertrain comprising an engine and at least one electric motor is presented. In one exemplary implementation, the method comprises: operating, by a controller of the electrified vehicle, the electrified powertrain in a normal regeneration mode associated with first electrical regeneration and vehicle deceleration rates or a maximum regeneration mode associated with greater second electrical regeneration and vehicle deceleration rates, receiving, by the controller and via the user interface, an input from a driver of the vehicle indicative of a request to enable the maximum regeneration mode, detecting, by the controller, a status of the maximum regeneration mode, wherein the status is indicative of an availability of the maximum regeneration mode, and in response to receiving the request and based on the status of the maximum regeneration mode and a current vehicle deceleration rate: (i) operating, by the controller, the electrified powertrain in either the maximum regeneration mode or the normal regeneration mode, (ii) selectively outputting, by the controller and via the user interface, a message to the driver indicative of the status of the maximum regeneration mode, and (iii) selectively commanding, by the controller, a hydraulic brake system of the vehicle to generate brake force based on a driver-expected vehicle deceleration rate associated with the operative regeneration mode.

In some implementations, the method further comprises controlling the electrified powertrain to use an electrical current generated by converting kinetic energy of the electrified powertrain to at least one of (i) recharge a battery system associated with the at least one electric motor and (ii) power an accessory load of the vehicle, wherein the second electrical regeneration rate of the maximum regeneration mode increases an electric range of the vehicle compared to first electrical regeneration rate of the normal regeneration mode. In some implementations, the electrified vehicle is a PHEV.

In some implementations, selectively commanding the hydraulic brake system comprises commanding the hydraulic brake system to apply hydraulic brakes to generate the brake force based on the driver-expected vehicle deceleration rate associated with the operative regeneration mode and without requiring any driver input via a brake pedal of the vehicle. In some implementations, selectively commanding the hydraulic brake system further comprises autonomously commanding the hydraulic brake system to utilize a vacuum-independent electric brake booster to generate and provide additional hydraulic brake pressure to the hydraulic brakes to thereby generate the brake force based on the driver-expected vehicle deceleration rate associated with the operative regeneration mode and without requiring any driver input via the brake pedal.

In some implementations, when the status indicates that the maximum regeneration mode is available, the method further comprises: determining, by the controller, whether the engine is connected to a transmission of the electrified vehicle, when the engine and the transmission are connected, operating, by the controller, the electrified powertrain such that kinetic energy at the engine and the at least one electric motor is collectively converted into electrical energy at the second regeneration rate, and when the engine and the transmission are disconnected, operating, by the controller, the electrified powertrain such that kinetic energy at the at least one electric motor is converted into electrical energy at the second regeneration rate.

In some implementations, determining the status of the maximum regeneration mode is based on (i) whether a malfunction of the vehicle that would limit the maximum regeneration mode is present, (ii) whether the vehicle malfunction is recoverable, and (iii) when the vehicle malfunction is recoverable, whether the vehicle malfunction has recovered. In some implementations, when the vehicle malfunction is not recoverable and the current vehicle deceleration rate is less than the first vehicle deceleration rate, the method further comprises: when the engine is off, starting, by the controller, the engine, operating, by the controller, the electrified powertrain in the normal regeneration mode such that kinetic energy at the engine and the at least one electric motor is collectively converted into electrical energy at the first regeneration rate and the current deceleration rate of the vehicle increases, outputting, by the controller and via the user interface, a message to the driver indicating that the maximum regeneration mode is unavailable, and selectively commanding, by the controller, the hydraulic brake system to generate the brake force based on the driver-expected vehicle deceleration rate associated with the operative regeneration mode and without requiring any driver input via a brake pedal of the vehicle.

In some implementations, when the vehicle malfunction is recoverable and has recovered, the method further comprises: operating, by the controller, the electrified powertrain in the maximum regeneration mode such that kinetic energy at the engine and the at least one electric motor is collectively converted into electrical energy at the second regeneration rate, and outputting, by the controller and via the user interface, a message to the driver indicating that the maximum regeneration mode is available. In some implementations, when the vehicle malfunction is recoverable but has not yet recovered, the controller is further configured to: operating, by the controller, the electrified powertrain in the normal regeneration mode such that kinetic energy at the engine and the at least one electric motor is collectively converted into electrical energy at the first regeneration rate, and outputting, by the controller and via the user interface, a message to the driver indicating that the maximum regeneration mode is temporarily unavailable.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

As previously discussed, conventional electrical regeneration systems on electrified vehicles suffer from only having a single regeneration rate, which could be less than optimal, and also do not provide a driver of the vehicle with an expected deceleration rate or feel when the electrical regeneration system is malfunctioning or is otherwise unavailable, such as due to other vehicle malfunction(s) that would prevent or otherwise limit or inhibit operation of the electrical regeneration system. Accordingly, improved electrical regeneration and vehicle deceleration control systems and methods are presented. These systems and methods provide a driver-selectable increased or "maximum" regeneration mode that converts vehicle kinetic energy into electrical energy at a higher rate than a default or "normal" regeneration mode. In turn, this also provides for a higher vehicle deceleration rate, which would be expected by the driver of the vehicle whenever this maximum regeneration mode is selected. When the maximum regeneration mode is unavailable, driver notifications could be provided via a user interface regarding the status of the maximum regeneration mode and other action could be taken, such as controlling the electrified powertrain and/or autonomously applying a hydraulic brake system to provide a driver-expected vehicle deceleration rate, and without the driver ever having to apply a brake pedal of the vehicle. Potential benefits include increased electric range of the electrified vehicle and improved driver experience because the driver will always experience the vehicle deceleration rate that he/she expects.

Figure 1:
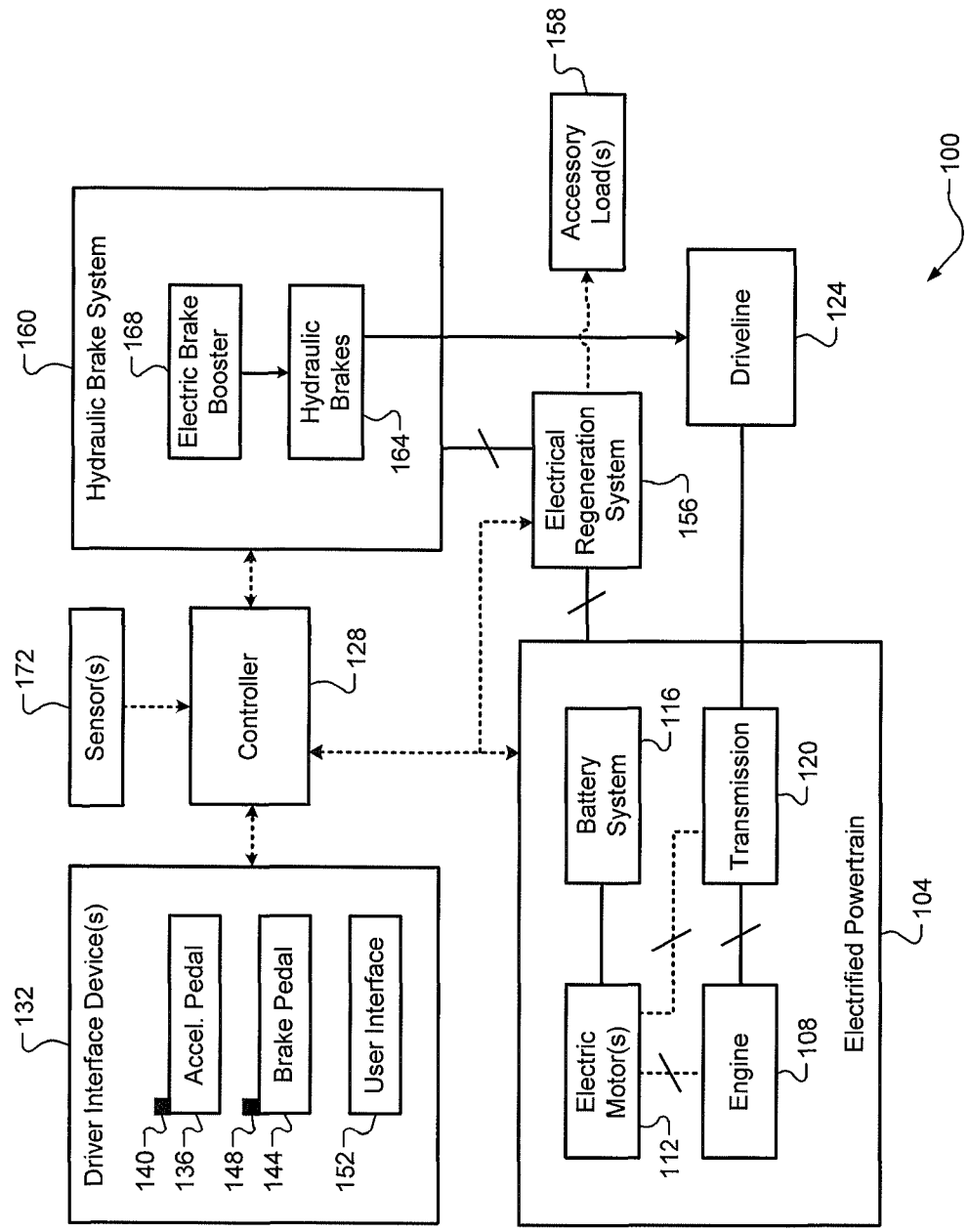
FIG. 1 is a functional block diagram of an electrified vehicle comprising an electrical regeneration and vehicle deceleration control system according to the principles of the present disclosure.

Referring now to FIG. 1, a functional block diagram of an electrified vehicle 100 having an example electrical regeneration and vehicle deceleration control system according to the principles of the present disclosure is illustrated. In one exemplary implementation, the electrified vehicle 100 is a plug-in hybrid electric vehicle (PHEV), but it will be appreciated that the electrified vehicle 100 could be any suitable electrified vehicle. The electrified vehicle 100 comprises an electrified powertrain 104 comprising an internal combustion engine 108 and one or more electric motor(s) 112 powered by a battery system 116 and that collectively generate drive torque that is transferred by a transmission 120 to a driveline 124 of the electrified vehicle 100 for propulsion. The electrified powertrain 104 is controlled by a controller 128 such that it generates enough drive torque to meet a torque request, which could be provided by a driver via one or more driver input devices 132, such as an accelerator pedal 136 having an associated accelerator pedal position sensor 140. It will be appreciated that the controller 128 could comprise a system of multiple controllers/processors, such as an engine controller and a hybrid controller. The driver input device(s) 132 could further include a brake pedal 144 having an associated brake pedal position sensor 148, and a user interface 152 (e.g., a touch display of an infotainment unit) for displaying information to and receiving input from the driver. An electrical regeneration system 156, which could at least partially integrated as part of the electrified powertrain 104, comprises one or more generators or other energy capture/conversion devices that convert vehicle kinetic energy to electrical energy (e.g., electrical current), which could then be used to recharge the battery system 116 and/or power other accessory load(s) 158 of the electrified vehicle 100 (e.g., pumps, compressors, fans, etc.)

The electrical regeneration system 156 is connected to some combination of the engine 104, the electric motor(s) 112, and the driveline 124 or component(s) of a hydraulic brake system 160 in order to convert the vehicle's kinetic energy. The hydraulic brake system 160 generates brake force that is applied to the driveline 124 (axle(s), wheel(s)/tire(s), etc.) to decrease a speed of the electrified vehicle 100. The hydraulic brake system 160 comprises hydraulic brakes 164, which build hydraulic brake pressure therein in response to driver depression of the brake pedal 144 or autonomously in response to control signal(s) from the controller 128. This hydraulic brake pressure is then used to apply the hydraulic brakes 164 to the driveline 124, thereby creating friction that decreases the speed of the electrified vehicle 100. The hydraulic brake system 160 also includes a vacuum-independent electric brake booster 168. The electric brake booster 168 is vacuum-independent in that it is operable independently of engine vacuum and is therefore capable of operating at any engine operating conditions. The electric brake booster 168 generates additional hydraulic brake pressure for the hydraulic brakes 164, thereby enabling the hydraulic brakes 164 to provide a greater brake force at the driveline 124. The electric brake booster 168 could be critical for the techniques of the present disclosure as there could be cases where the hydraulic brakes 164 could not on their own provide sufficient brake force to achieve the driver-expected vehicle deceleration rate. In addition, the electric brake booster 168 is much faster or more responsive (e.g., four times faster) than conventional electronic stability control (ESC) systems that could alternatively be used to provide additional braking capabilities. The electrified vehicle 100 could also include one or more other sensors 172 for sensing various vehicle/powertrain operating parameters, such as a vehicle speed sensor and speed/temperature/pressure/state (e.g., state of charge, or SOC) sensors of components of the electrified powertrain 104 (the engine 108, the electric motor(s) 112, the battery system 116, etc.).

The controller 128 is also configured to perform at least a portion of the electrical regeneration and vehicle deceleration control techniques of the present disclosure. This includes operating the vehicle 100 or the electrified powertrain 104 in a default or "normal" regeneration mode or, in response to a driver input, in an increases or "maximum" regeneration mode. It will be appreciated that the phrase "maximum regeneration mode" as used herein could refer to any regeneration mode that generates additional electrical energy and causes a greater vehicle deceleration rate than the normal regeneration mode. It will also be appreciated that there could be multiple different increased regeneration modes having different levels of electrical energy generation and causing different rates of vehicle deceleration, and a highest or most aggressive one of these could be termed the maximum regeneration mode. The maximum regeneration mode, in generating additional electrical energy compared to the normal regeneration mode, could be utilized for, among other things, increased recharging of the battery system 116, which could thereby extend the electric range of the electrified vehicle 100. The distribution or split between kinetic energy converted from the engine 108 compared to the electric motor(s) 112 could be intelligently determined in real-time based on, for example, the measured speeds/temperatures/pressures/states by sensor(s) 172 of the components of the electrified powertrain 104.

As the maximum regeneration mode is driver-selectable, the driver could enable this mode by, for example only, providing an input via the user interface 152 (e.g., a touch input of a button or icon). In doing so, the driver is aware of his/her selection and would expect a vehicle deceleration rate consistent with the maximum regeneration mode. In some scenarios, however, this maximum regeneration mode may be unavailable. Thus, the controller 128 determines the status of the maximum regeneration mode. There could be a variety of vehicle malfunctions that could be present that could inhibit or otherwise limit the operation of the maximum regeneration mode, including, but not limited to, controller/processor malfunctions, memory malfunctions, and component malfunctions (the electrified powertrain 104, the electrical regeneration system 156, the hydraulic brake system 160, etc.). This detected "status" of the maximum regeneration mode is thus indicative of the current availability of the maximum regeneration mode. Some vehicle malfunctions, however, are recoverable. For example, a diagnostic could be performed to detect that a vehicle malfunction is no longer present or some curative or adjustment routine could be expected to recover the vehicle malfunction. Thus, the status of the maximum regeneration mode could change depending on whether or not the vehicle malfunction is recoverable.

Figure 2:
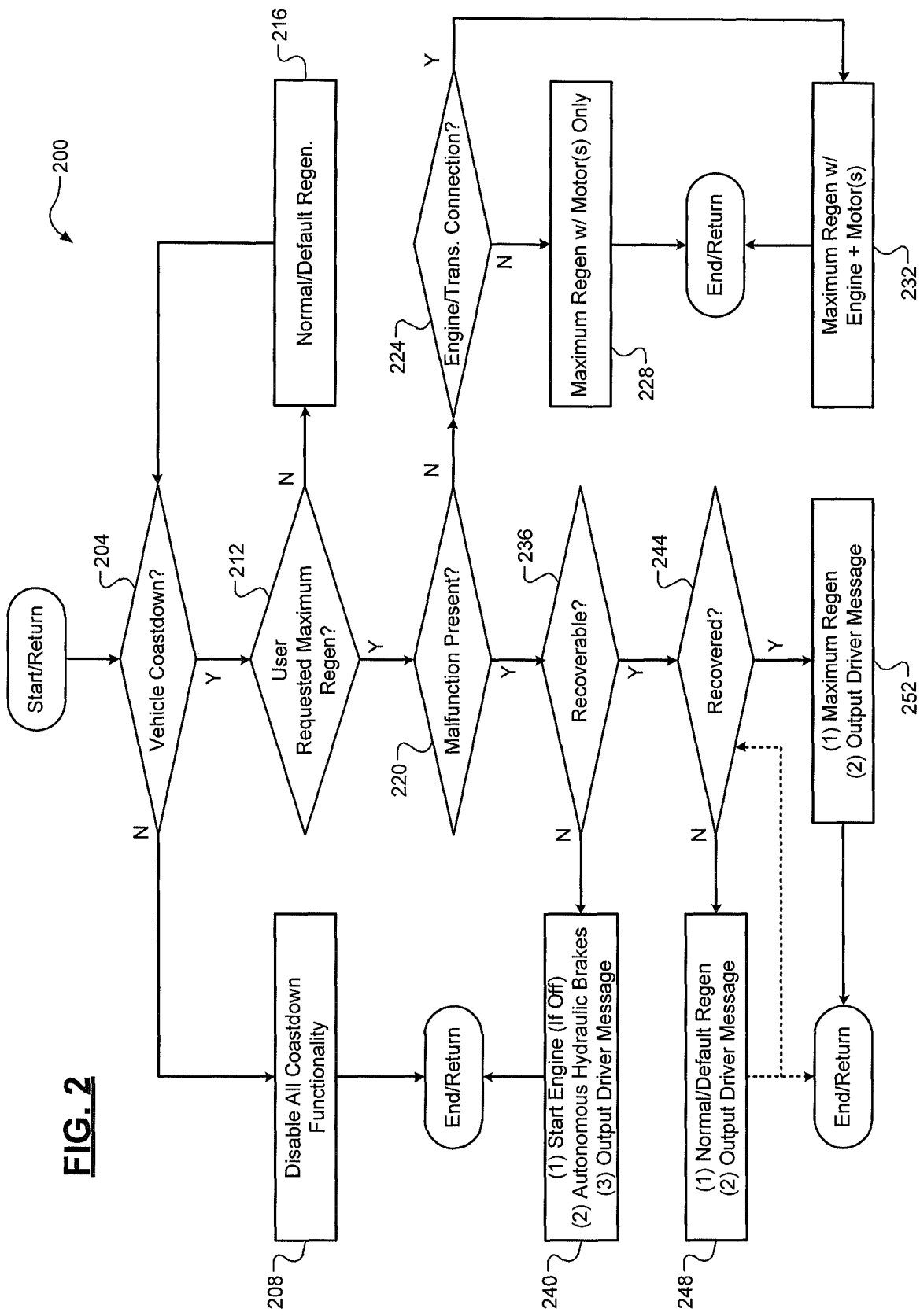
FIG. 2 is a flow diagram of an example electrical regeneration and vehicle deceleration control method for an electrified vehicle according to the principles of the present disclosure.

Referring now to FIG. 2 and with continued reference to FIG. 1, a flow diagram of an example electrical regeneration and vehicle deceleration control method 200 for an electrified vehicle (e.g., electrified vehicle 100) according to the principles of the present disclosure is presented. At 204, the controller 128 determines whether the electrified vehicle 100 is currently experiencing a deceleration or "coastdown" event. This could be, for example, in response to no depression (or less than a threshold of depression) of the accelerator pedal 136 (e.g., as measured by sensor 140) and no depression (or less than a threshold of depression) of the brake pedal 144 (e.g., as measured by sensor 148). Vehicle speed (e.g., from sensor(s) 172) could also be taken into account. In some cases, this could trigger a deceleration fuel-shutoff (DFSO) event where fueling to the engine 108 is temporarily suspended, but it will also be appreciated that the engine 108 could continue running (e.g., to provide additional kinetic energy for conversion to electrical energy and in turn more vehicle deceleration). When the vehicle deceleration/coastdown is not occurring, neither the normal nor the maximum regeneration modes are enabled and no vehicle deceleration control occurs at 208 and the method 200 ends or returns. When vehicle deceleration/coastdown is occurring, however, the method 200 proceeds to 212. At 212, the controller 128 determines whether the request to enable the maximum regeneration mode has been received from the driver (e.g., via user interface 152). When the maximum regeneration mode request has not been received, the controller 128 operates the electrified powertrain 104 in the normal regeneration mode at 216 and the method 200 ends or returns.

When the maximum regeneration mode has been received, the method 200 proceeds to 220. Based on the status of the maximum regeneration mode and a current deceleration of the electrified vehicle 100 (e.g., based on measurements from sensor(s) 172, such as a vehicle speed sensor), the controller 128 is then configured to perform a variety of different operations. At 220, the controller 128 determines whether vehicle malfunction(s) are present that would prevent or otherwise limit or inhibit the operation of the maximum regeneration mode. This is also described herein as part of the controller 128 determining the status of the maximum regeneration mode indicative of its availability. When no vehicle malfunction(s) are present, the controller 128 at 224 determines whether the engine 108 and the transmission 120 are connected (e.g., via a fluid coupling or a torque converter). When disconnected, the controller 128 at 228 controls the electrified powertrain 104 such that only the electric motor(s) 112 provide the kinetic energy that is converted by the electrical regeneration system 156 to electrical energy to achieve the higher (second) regeneration rate and the higher (second) vehicle deceleration rate and the method 200 ends or returns. When connected, the controller 128 at 232 controls the electrified powertrain 104 such that the engine 108 and the electric motor(s) 112 collectively provide (e.g., in some optimally split manner) the kinetic energy that is converted by the electrical regeneration system 156 to electrical energy at similar levels/rates as described with respect to 228 and the method 200 ends or returns.

At 236, when vehicle malfunction(s) are detected, the controller 128 determines whether the vehicle malfunction(s) are recoverable. When the vehicle malfunction(s) are not recoverable and the current vehicle deceleration rate is less than the vehicle deceleration rate associated with the normal regeneration mode, the method 200 proceeds to 240. At 240, the controller 128 is configured to perform the following steps: (i) when the engine 108 is off (e.g., due to a previous DFSO event), start the engine 108 (e.g., because it is desirable for the electrified powertrain 104 to provide as much kinetic energy conversion and vehicle deceleration as possible), (ii) output a message to the driver (e.g., via the user interface 152) indicating that the maximum regeneration mode is unavailable. In addition, the controller 128 is also configured to autonomously apply the hydraulic brake system 160 to provide any additional required vehicle deceleration to achieve the driver-expected vehicle deceleration rate associated with the normal regeneration mode. In some cases, this will involve the electric brake booster 168 providing the hydraulic brakes 164 with fast additional hydraulic brake pressure because the hydraulic brakes 164 are incapable of providing enough brake force to achieve the driver-expected vehicle deceleration rate. The method 200 then ends or returns.

When the vehicle malfunction(s) are recoverable at 236, the method 200 proceeds to 244 where the controller 128 determines whether the vehicle malfunction(s) have recovered. When the vehicle malfunction(s) have recovered, the method 200 proceeds to 248. At 248, the controller 128 is configured to operate the electrified powertrain 104 in the normal regeneration mode as previously described herein also configured to output a message to the driver of the electrified vehicle 104 (e.g., via the user interface 152) that the maximum regeneration mode is temporarily unavailable, which provides the driver with adequate notification that the vehicle deceleration rate associated with the normal regeneration mode should be expected. It should be noted that this driver message indicates that the maximum regeneration mode is temporarily unavailable, because the vehicle malfunction(s) could subsequently recover and then the maximum regeneration mode could be available and enabled. After 248, the method 200 could end/return or return directly to 244 and wait to see if the vehicle malfunction(s) recover. When the vehicle malfunction(s) have recovered, the method 200 proceeds from 244 to 252. At 252, the controller 128 is configured to operate the electrified powertrain 104 in the maximum regeneration mode (similar to as described above with respect to maximum regeneration mode operation, depending on whether the engine 108 and the transmission 120 are connected or not), and the controller 128 is also configured to output a message to the driver of the electrified vehicle 100 (e.g., via the user interface 152) indicating that the maximum regeneration mode is available and currently operational. Similar to the other message described above, this message could provide the driver with adequate notification as to what level of vehicle deceleration to expect (e.g., because the malfunction could have been previously and temporarily unavailable before the vehicle malfunction(s) recovered). The method 200 then ends or returns.

It will be appreciated that the term "controller" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. An electrical regeneration and vehicle deceleration control system for an electrified vehicle having an electrified powertrain comprising an engine and at least one electric motor, the control system comprising:
   a user interface; and
   a controller configured to:
   operate the electrified powertrain in a normal regeneration mode associated with a first electrical regeneration rate and a first vehicle deceleration rate or a maximum regeneration mode associated with a second electrical regeneration rate and a second vehicle deceleration rate that are greater than the first electrical regeneration rate and the first vehicle deceleration rate, respectively;
   receive, via the user interface, an input from a driver of the vehicle indicative of a request to enable the maximum regeneration mode;
   detect a status of the maximum regeneration mode, wherein the status is indicative of an availability of the maximum regeneration mode; and
   in response to receiving the request and based on the status of the maximum regeneration mode and a current vehicle deceleration rate:
      (i) operate the electrified powertrain in either the maximum regeneration mode or the normal regeneration mode;
      (ii) selectively output, via the user interface, a message to the driver indicative of the status of the maximum regeneration mode; and
      (iii) selectively command a hydraulic brake system of the vehicle to generate brake force based on a driver-expected vehicle deceleration rate associated with the operative regeneration mode,
   wherein the controller is further configured to autonomously command the hydraulic brake system to apply the hydraulic brake system to generate the brake force based on the driver-expected vehicle deceleration rate associated with the operative regeneration mode and without requiring any driver input via a brake pedal of the vehicle, and
   wherein the controller is further configured to autonomously command the hydraulic brake system to utilize a vacuum-independent electric brake booster to generate and provide additional hydraulic brake pressure to the hydraulic brake system to thereby generate the brake force based on the driver-expected vehicle deceleration rate associated with the operative regeneration mode and without requiring any driver input via the brake pedal.

2. The control system of claim 1, wherein the controller is further configured to control the electrified powertrain to use an electrical current generated by converting kinetic energy of the electrified powertrain to at least one of (i) recharge a battery system associated with the at least one electric motor and (ii) power an accessory load of the vehicle,
   wherein the second electrical regeneration rate of the maximum regeneration mode increases an electric range of the vehicle compared to the first electrical regeneration rate of the normal regeneration mode.

3. The control system of claim 1, wherein when the status indicates that the maximum regeneration mode is available, the controller is further configured to:
   determine whether the engine is connected to a transmission of the electrified vehicle;
   when the engine and the transmission are connected, operate the electrified powertrain such that kinetic energy at the engine and the at least one electric motor is collectively converted into electrical energy at the second electrical regeneration rate; and
   when the engine and the transmission are disconnected, operate the electrified powertrain such that kinetic energy at the at least one electric motor is converted into electrical energy at the second electrical regeneration rate.

4. The control system of claim 1, wherein the controller is configured to determine the status of the maximum regeneration mode based on (i) whether a malfunction of the vehicle that would limit the maximum regeneration mode is present, (ii) whether the vehicle malfunction is recoverable, and (iii) when the vehicle malfunction is recoverable, whether the vehicle malfunction has recovered.

5. The control system of claim 4, wherein when the vehicle malfunction is not recoverable and the current vehicle deceleration rate is less than the first vehicle deceleration rate, the controller is further configured to:
   when the engine is off, start the engine;
   operate the electrified powertrain in the normal regeneration mode such that kinetic energy at the engine and the at least one electric motor is collectively converted into electrical energy at the first electrical regeneration rate and the current deceleration rate of the vehicle increases;
   output, via the user interface, a message to the driver indicating that the maximum regeneration mode is unavailable; and
   selectively command the hydraulic brake system to generate the brake force based on the driver-expected vehicle deceleration rate associated with the operative regeneration mode and without requiring any driver input via a brake pedal of the vehicle.

6. The control system of claim 4, wherein when the vehicle malfunction is recoverable and has recovered, the controller is further configured to:
- operate the electrified powertrain in the maximum regeneration mode such that kinetic energy at the engine and the at least one electric motor is collectively converted into electrical energy at the second electrical regeneration rate; and
- output, via the user interface, a message to the driver indicating that the maximum regeneration mode is available.

7. The control system of claim 4, wherein when the vehicle malfunction is recoverable but has not yet recovered, the controller is further configured to:
- operate the electrified powertrain in the normal regeneration mode such that kinetic energy at the engine and the at least one electric motor is collectively converted into electrical energy at the first electrical regeneration rate; and
- output, via the user interface, a message to the driver indicating that the maximum regeneration mode is temporarily unavailable.

8. The control system of claim 1, wherein the electrified vehicle is a plug-in hybrid electric vehicle (PHEV).

9. An electrical regeneration and vehicle deceleration control method for an electrified vehicle having an electrified powertrain comprising an engine and at least one electric motor, the method comprising:
- operating, by a controller of the electrified vehicle, the electrified powertrain in a normal regeneration mode associated with a first electrical regeneration and a first vehicle deceleration rate or a maximum regeneration mode associated with a second electrical regeneration and a second vehicle deceleration rate that are greater than the first electrical regeneration rate and the first vehicle deceleration rate, respectively;
- receiving, by the controller and via the user interface, an input from a driver of the vehicle indicative of a request to enable the maximum regeneration mode;
- detecting, by the controller, a status of the maximum regeneration mode, wherein the status is indicative of an availability of the maximum regeneration mode; and
- in response to receiving the request and based on the status of the maximum regeneration mode and a current vehicle deceleration rate:
  - (i) operating, by the controller, the electrified powertrain in either the maximum regeneration mode or the normal regeneration mode;
  - (ii) selectively outputting, by the controller and via the user interface, a message to the driver indicative of the status of the maximum regeneration mode; and
  - (iii) selectively commanding, by the controller, a hydraulic brake system of the vehicle to generate brake force based on a driver-expected vehicle deceleration rate associated with the operative regeneration mode,
- wherein when the status indicates that the maximum regeneration mode is available, the method further comprises:
  - determining, by the controller, whether the engine is connected to a transmission of the electrified vehicle;
  - when the engine and the transmission are connected, operating, by the controller, the electrified powertrain such that kinetic energy at the engine and the at least one electric motor is collectively converted into electrical energy at the second electrical regeneration rate; and
  - when the engine and the transmission are disconnected, operating, by the controller, the electrified powertrain such that kinetic energy at the at least one electric motor is converted into electrical energy at the second electrical regeneration rate.

10. The method of claim 9, further comprising controlling the electrified powertrain to use an electrical current generated by converting kinetic energy of the electrified powertrain to at least one of (i) recharge a battery system associated with the at least one electric motor and (ii) power an accessory load of the vehicle,
- wherein the second electrical regeneration rate of the maximum regeneration mode increases an electric range of the vehicle compared to the first electrical regeneration rate of the normal regeneration mode.

11. The method of claim 9, wherein selectively commanding the hydraulic brake system comprises autonomously commanding the hydraulic brake system to apply the hydraulic brake system to generate the brake force based on the driver-expected vehicle deceleration rate associated with the operative regeneration mode and without requiring any driver input via a brake pedal of the vehicle.

12. The method of claim 11, wherein selectively commanding the hydraulic brake system further comprises autonomously commanding the hydraulic brake system to utilize a vacuum-independent electric brake booster to generate and provide additional hydraulic brake pressure to the hydraulic brake system to thereby generate the brake force based on the driver-expected vehicle deceleration rate associated with the operative regeneration mode and without requiring any driver input via the brake pedal.

13. The method of claim 9, wherein determining the status of the maximum regeneration mode is based on (i) whether a malfunction of the vehicle that would limit the maximum regeneration mode is present, (ii) whether the vehicle malfunction is recoverable, and (iii) when the vehicle malfunction is recoverable, whether the vehicle malfunction has recovered.

14. The method of claim 13, wherein when the vehicle malfunction is not recoverable and the current vehicle deceleration rate is less than the first vehicle deceleration rate, the method further comprises:
- when the engine is off, starting, by the controller, the engine;
- operating, by the controller, the electrified powertrain in the normal regeneration mode such that kinetic energy at the engine and the at least one electric motor is collectively converted into electrical energy at the first electrical regeneration rate and the current deceleration rate of the vehicle increases;
- outputting, by the controller and via the user interface, a message to the driver indicating that the maximum regeneration mode is unavailable; and
- selectively commanding, by the controller, the hydraulic brake system to generate the brake force based on the driver-expected vehicle deceleration rate associated with the operative regeneration mode and without requiring any driver input via a brake pedal of the vehicle.

15. The method of claim 13, wherein when the vehicle malfunction is recoverable and has recovered, the method further comprises:
- operating, by the controller, the electrified powertrain in the maximum regeneration mode such that kinetic energy at the engine and the at least one electric motor is collectively converted into electrical energy at the second electrical regeneration rate; and outputting, by the controller and via the user interface, a message to the driver indicating that the maximum regeneration mode is available.

16. The method of claim 13, wherein when the vehicle malfunction is recoverable but has not yet recovered, the controller is further configured to:
operating, by the controller, the electrified powertrain in the normal regeneration mode such that kinetic energy at the engine and the at least one electric motor is collectively converted into electrical energy at the first electrical regeneration rate; and
outputting, by the controller and via the user interface, a message to the driver indicating that the maximum regeneration mode is temporarily unavailable.

17. An electrical regeneration and vehicle deceleration control method for an electrified vehicle having an electrified powertrain comprising an engine and at least one electric motor, the method comprising:
operating, by a controller of the electrified vehicle, the electrified powertrain in a normal regeneration mode associated with a first electrical regeneration and a first vehicle deceleration rate or a maximum regeneration mode associated with a second electrical regeneration and a second vehicle deceleration rate that are greater than the first electrical regeneration rate and the first vehicle deceleration rate, respectively;
receiving, by the controller and via the user interface, an input from a driver of the vehicle indicative of a request to enable the maximum regeneration mode;
detecting, by the controller, a status of the maximum regeneration mode, wherein the status is indicative of an availability of the maximum regeneration mode, wherein detecting the status of the maximum regeneration mode is based on (i) whether a malfunction of the vehicle that would limit the maximum regeneration mode is present, (ii) whether the vehicle malfunction is recoverable, and (iii) when the vehicle malfunction is recoverable, whether the vehicle malfunction has recovered; and
in response to receiving the request and based on the status of the maximum regeneration mode and a current vehicle deceleration rate:
(i) operating, by the controller, the electrified powertrain in either the maximum regeneration mode or the normal regeneration mode;
(ii) selectively outputting, by the controller and via the user interface, a message to the driver indicative of the status of the maximum regeneration mode; and
(iii) selectively commanding, by the controller, a hydraulic brake system of the vehicle to generate brake force based on a driver-expected vehicle deceleration rate associated with the operative regeneration mode.

18. The method of claim 17, wherein when the vehicle malfunction is not recoverable and the current vehicle deceleration rate is less than the first vehicle deceleration rate, the method further comprises:
when the engine is off, starting, by the controller, the engine;
operating, by the controller, the electrified powertrain in the normal regeneration mode such that kinetic energy at the engine and the at least one electric motor is collectively converted into electrical energy at the first electrical regeneration rate and the current deceleration rate of the vehicle increases;
outputting, by the controller and via the user interface, a message to the driver indicating that the maximum regeneration mode is unavailable; and
selectively commanding, by the controller, the hydraulic brake system to generate the brake force based on the driver-expected vehicle deceleration rate associated with the operative regeneration mode and without requiring any driver input via a brake pedal of the vehicle.

19. The method of claim 17, wherein when the vehicle malfunction is recoverable and has recovered, the method further comprises:
operating, by the controller, the electrified powertrain in the maximum regeneration mode such that kinetic energy at the engine and the at least one electric motor is collectively converted into electrical energy at the second electrical regeneration rate; and
outputting, by the controller and via the user interface, a message to the driver indicating that the maximum regeneration mode is available.

20. The method of claim 17, wherein when the vehicle malfunction is recoverable but has not yet recovered, the controller is further configured to:
operating, by the controller, the electrified powertrain in the normal regeneration mode such that kinetic energy at the engine and the at least one electric motor is collectively converted into electrical energy at the first electrical regeneration rate; and
outputting, by the controller and via the user interface, a message to the driver indicating that the maximum regeneration mode is temporarily unavailable.

* * * * *